United States Patent [19]

Saban

[11] 4,438,646
[45] Mar. 27, 1984

[54] CRANKSHAFT JOURNAL SURFACE GAUGE AND KIT THEREOF

[75] Inventor: C. John Saban, Morton, Ill.

[73] Assignee: Caterpillar Tractor Co., Peoria, Ill.

[21] Appl. No.: 232,937

[22] Filed: Feb. 9, 1981

Related U.S. Application Data

[60] Division of Ser. No. 225,921, Jan. 19, 1981, abandoned, which is a continuation of Ser. No. 91,678, May 21, 1979, abandoned.

[51] Int. Cl.³ .............................................. G01B 21/30
[52] U.S. Cl. ......................................... 73/105; 33/403
[58] Field of Search ............... 73/105, 120; 33/174 H, 33/174 M, 181 R, 182, 403, 430, 448, DIG. 1, 174 P, 174 G, 174 PB, 199 R

[56] References Cited

U.S. PATENT DOCUMENTS

| | | | |
|---|---|---|---|
| 191,315 | 5/1877 | Coleman | 33/199 R |
| D. 221,107 | 7/1971 | Miller | 33/484 |
| 284,702 | 9/1883 | Wyke | 33/174 R |
| 451,123 | 4/1891 | Grannis | 33/185 R |
| 589,572 | 9/1897 | Phillips | 33/174 R |
| 781,960 | 2/1905 | Marbach | 33/178 |
| 804,067 | 11/1905 | Stowe | 409/133 X |
| 1,017,639 | 2/1912 | Mershon | 33/174 R |
| 1,357,588 | 11/1920 | Peck | 33/199 R |
| 1,424,556 | 8/1922 | Cooke | 356/390 |
| 1,455,864 | 5/1923 | Busick | 73/120 |
| 2,018,106 | 10/1935 | Zahodiakin | 73/120 |
| 2,197,308 | 4/1940 | Kolbetel | 51/165.72 |
| 2,372,451 | 3/1945 | Reason | 73/105 |
| 2,433,558 | 12/1947 | Hurley | 73/120 |
| 2,441,343 | 5/1948 | Becker | 73/120 |
| 2,474,015 | 6/1949 | Shaw | 73/105 |
| 2,667,703 | 2/1954 | Zumkeller | 33/185 R |
| 2,672,049 | 3/1954 | Hallendorf | 73/105 |
| 2,955,359 | 10/1960 | Carpenter | 409/218 X |
| 2,994,220 | 8/1961 | Halgren | 73/105 |
| 3,106,023 | 10/1963 | Wilson | 33/185 R |
| 3,368,395 | 2/1968 | Wright | 73/105 |
| 3,524,260 | 8/1970 | Ollar | 33/174 R |

FOREIGN PATENT DOCUMENTS

| | | | |
|---|---|---|---|
| 859556 | 12/1952 | Fed. Rep. of Germany | 33/DIG. 1 |
| 52-1208 | 1/1977 | Japan | 409/131 |
| 198764 | 12/1964 | U.S.S.R. | 73/119 |

OTHER PUBLICATIONS

"Inspection Gages", p. 111, Feb. 18, 1943 Issue of American Machinist.

Primary Examiner—S. Clement Swisher
Attorney, Agent, or Firm—Phillips, Moore, Lempio & Finley

[57] ABSTRACT

Surface irregularities on a member (12), such as a main bearing or rod journal of a crankshaft (13), are determined by engaging a template edge (15,28) of a surface gauge (10,24) on the surface. A first side of the gauge (10,24) is subjected to light (19) to enable a worker to detect any light emitted between the surface (11) and template edge (15,28) which will indicate irregularities in the surface (11). The surface (11) is then machined to remove such irregularities. A plurality of such surface gauges (10,10',24) having template edges (15,15',28) of varied lengths, may be provided to the worker in kit form to facilitate the gauging of substantially all journal surfaces (11,22) in an engine, for example. Expeditious gauging of various journal surfaces (11,22) may thus be accomplished with a high degree of quality control.

8 Claims, 4 Drawing Figures

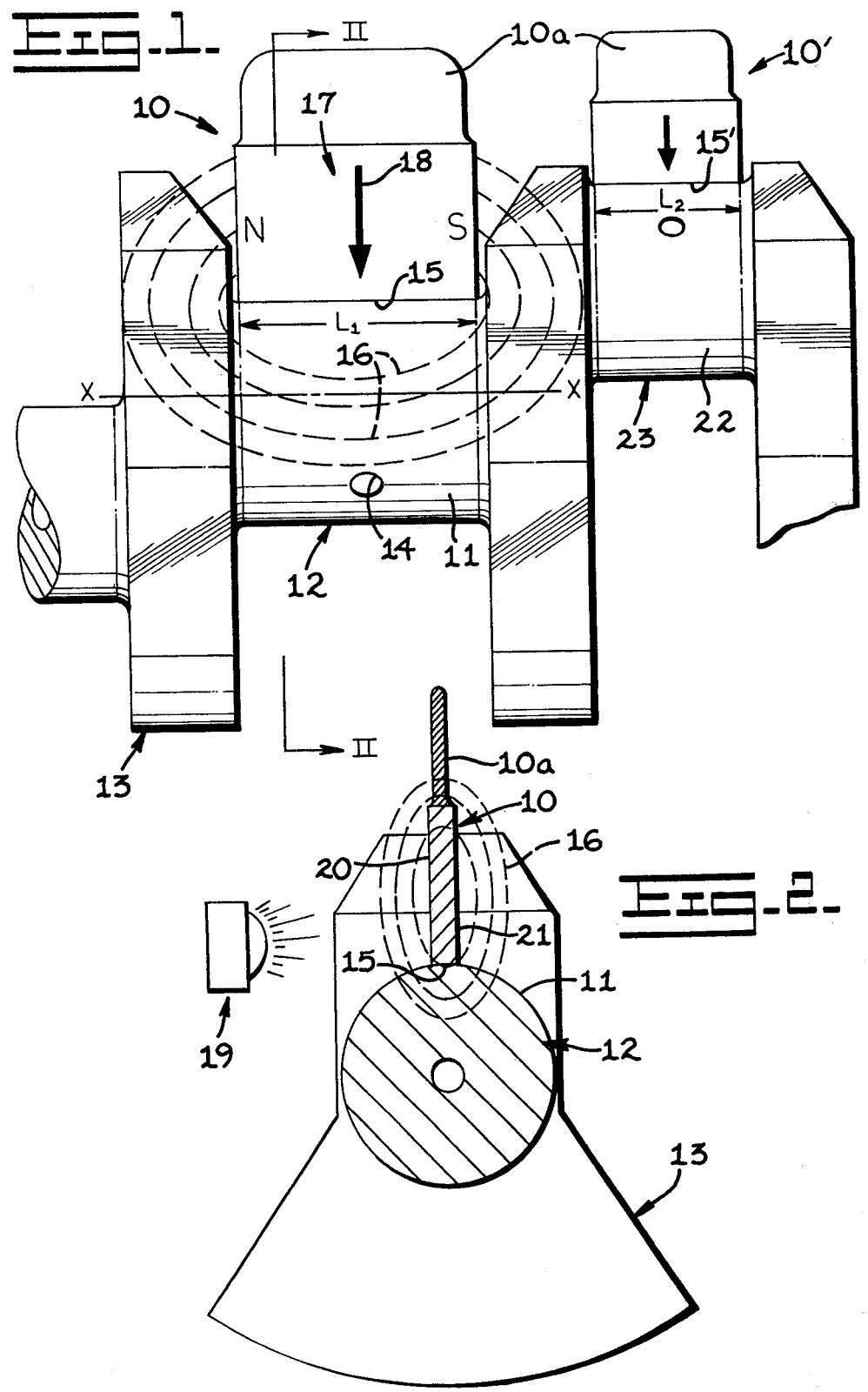

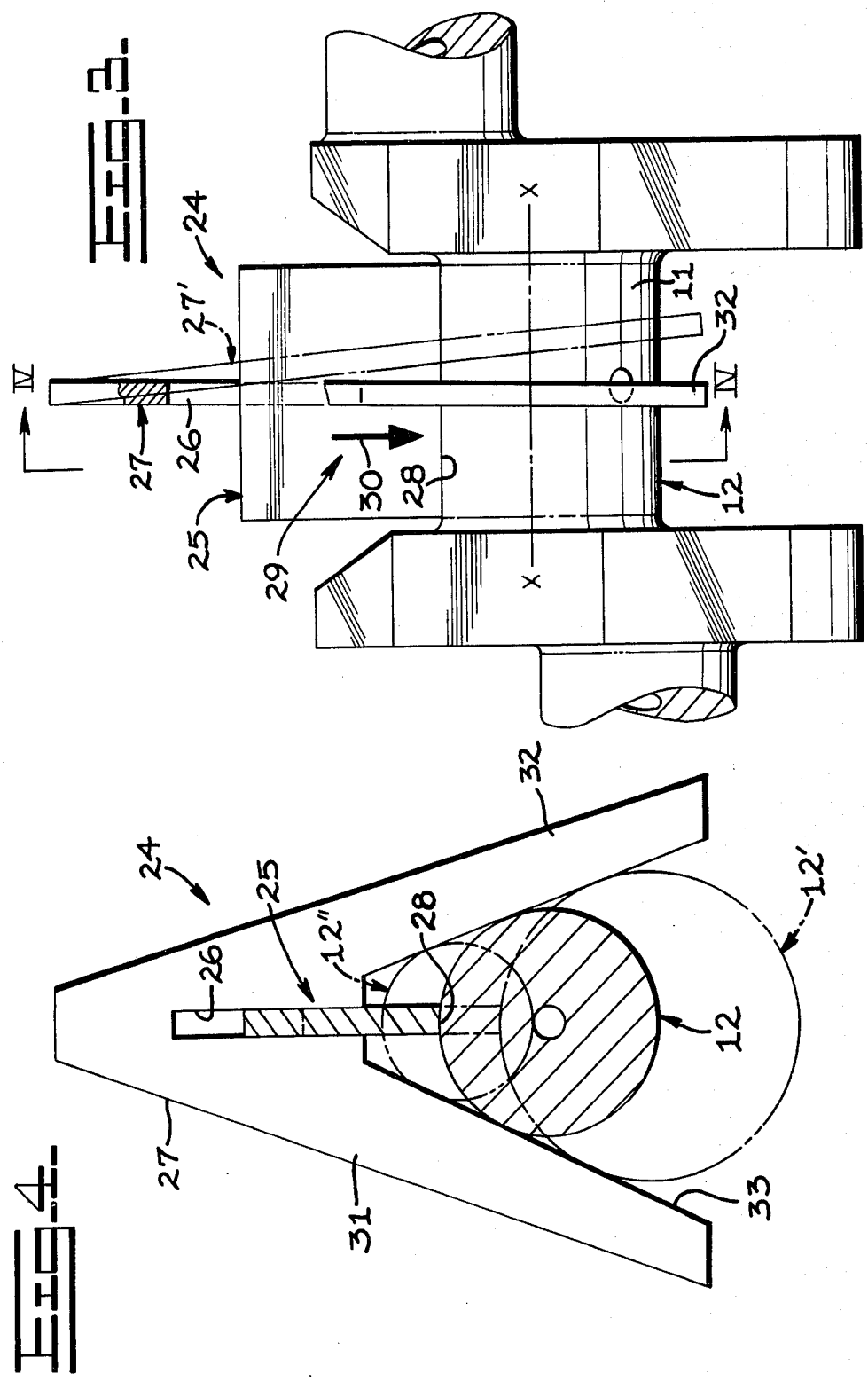

CRANKSHAFT JOURNAL SURFACE GAUGE AND KIT THEREOF

This application is a division of Ser. No. 225,921, filed Jan. 19, 1981, now abandoned, which was a continuation of Ser. No. 91,678, filed May 21, 1979, now abandoned.

DESCRIPTION

TECHNICAL FIELD

This invention relates to a profile gauge for determining surface irregularities on an arcuate surface. A plurality of such devices in kitform, having different lengths, are adapted to gauge surface irregularities on various journals employed in an internal combustion engine, such as the crankshaft and rod journals thereof.

BACKGROUND ART

The servicing and repair of internal combustion engines oftentimes includes the surface finishing of various bearing journals employed in the engine, such as the main bearing journals and the rod journals of the crankshaft thereof. Machining of such journals, to bring them into acceptable tolerances, must be preceded by a gauging operation to determine the surface conditions thereof. One approach is to engage each cylindrical journal surface with a gauge to measure the irregularities of such surface. A pickup of the gauge normally traverses the journal surface and reciprocates to either provide a read-out on a suitably calibrated dial or to provide an electrical signal directly proportional to vertical displacement of the pickup.

Gauges of this type are normally not available at a servicing and repair center and thus other gauging procedures must be utilized. Furthermore, the use of such gauges oftentimes requires removal of the tested part, such as a crankshaft, from the engine resulting in substantial down-time of the engine and increased costs.

Another conventional procedure for determining surface irregularities on a particular journal is to provide the worker with a plurality of specimens which are replicas of various surface textures. The worker can compare such specimens to the journal surface under consideration by sight and feel and thus determine whether or not the journal surface requires machining to bring it within the desired tolerance. In particular, the worker may run his fingernail or a coin over the specimen displaying the desired surface finish thereon, as well as the journal surface, to compare the surface textures thereof. Although this surface texture comparison procedure has proven effective, it is obvious that it is prone to error on the part of the worker.

DISCLOSURE OF THE INVENTION

The present invention is directed to overcoming one or more of the problems as set forth above.

In one aspect of this invention, a crankshaft journal surface gauge for detecting surface irregularities on a crankshaft journal comprises a metallic and magnetized plate having a straight and uninterrupted template edge means for engaging the crankshaft journal to detect irregularities therein.

In another aspect of this invention, the surface gauge further includes a holder having a slot therein. A plate having a straight and uninterrupted template edge means is reciprocally mounted in the slot to engage the crankshaft journal.

In still another aspect of this invention, a plurality of such surface gauges are provided in kit-form with the respective template edge means of the gauges having different lengths for detecting irregularities on surfaces having different lengths.

The above surface gauge thus provides for the expeditious gauging of a surface to detect any irregularities thereon. The quality control thus provided is quite high and leaves little chance for human error. In addition, the surface gauge of this invention may be utilized when the crankshaft of an engine, for example, remains mounted in the engine. Furthermore, a plurality of such surface gauges may be provided in kit-form to service substantially all of the bearing journals used in an internal combustion engine, for example.

BRIEF DESCRIPTION OF THE DRAWINGS

Other objects of this invention will become apparent from the following description and the accompanying drawings wherein:

FIG. 1 is a side elevational view, partially illustrating a crankshaft of an internal combustion engine having a surface gauge embodiment of the present invention mounted on a bearing journal thereof;

FIG. 2 is a cross-sectional view, through the journal and surface gauge, taken in the direction of arrows II—II in FIG. 1;

FIGS. 3 and 4 are views similar to FIGS. 1 and 2, respectively, but illustrating a second surface gauge embodiment of this invention associated with a bearing journal of a crankshaft.

BEST MODE OF CARRYING OUT THE INVENTION

FIGS. 1 and 2 illustrate a rectangular surface gauge 10 of the profile-type mounted on an outer cylindrical bearing surface 11 of a journal 12. Journal 12 may constitute a main bearing journal of a crankshaft 13 of an internal combustion engine wherein surface 11 thereof must be precisely machined within an acceptable close tolerance. The precise machining of cylindrical journal surface 11 ensures that lubricating oil communicated to the journal surface via one or more oil ports 14, will provide adequate lubrication when journal 12 is rotatably mounted in a sleeve bearing (not shown) mounted on the engine.

Surface gauge 10 has a template edge 15 formed thereon for engaging arcuate journal surface 11, disposed for rotation about a longitudinal axis X thereof, for detecting any irregularities on the surface. Template edge 15 is pre-machined to exhibit a straight edge having a tolerance of ±ten micro-inches. Surface gauge 10 is preferably composed of a suitable metal whereby it can be magnetized to comprise north (N) and south (S) poles. As shown, flux lines 16 of magnetized surface gauge 10 will releasably secure the surface gauge in place on journal 12 without the aid of any mechanical support therefor.

An indicia means 17, shown in the form of an arrow 18 disposed in perpendicular relationship relative to template edge 15, may be suitably formed on a surface of gauge 10, if so desired, to indicate to the worker which of the four edges of surface gauge 10 constitutes template edge 15. Alternatively, or in addition to indicia means 17, a positioning handle 10a, preferably composed of a pliable plastic material, may be bonded or otherwise suitably secured to a top edge of gauge 10. Since the worker will readily recognize that template edge 15 is formed opposite to handle 10a, arrow 18 could be eliminated, if so desired.

The worker will normally line-sight surface gauge 10 on journal 12, in at least substantially parallel relationship relative to longitudinal axis X thereof. As shown in FIG. 2, a standard light source 19, such as a lamp, is disposed on a first side 20 of gauge 10 whereby a worker positioned on a second side 21 of the gauge may visually detect the emission of light between outer surface 11 of journal 12 and template edge 15. Handle 10a will aid in blocking passage of excess light thereby to aid the worker in detecting emission of light between surface 11 and edge 15.

Such emission of light will indicate to the worker whether or not any portions of journal surface 11 require machining. The worker will normally suitably mark the areas of surface 11 whereat irregularities occur prior to machining thereof. Surface gauge 10 will normally indicate any grooves or other types of surface irregularities which have a depth of 200 micro-inches or greater. If so desired, standard surface texture comparison replicas of the type discussed above may be utilized by the worker to ensure that the machining operation has machined journal surface 11 within an acceptable tolerance range.

Another feature of the present invention is that a plurality of surface gauges 10 may be provided in kit-form to the worker whereby he is enabled to gauge substantially all journals employed in a particular engine to determine any surface irregularities thereon. In one application, a kit of this type includes four separate gauges 10 having template edges 15 with respective lengths of 1", 1.39", 1.80" and 2.90". As shown in FIG. 1, template edge 15 of gauge 10 could have a length $L_1$ of 2.90" whereas a template edge 15' of a second gauge 10' could have a length $L_2$ of 1.39", for example. Second gauge 10' would be utilized to determine the surface irregularities, if any, on a cylindrical surface 22 of a connecting rod journal 23. Gauge 10 is preferably composed of a suitable metallic material which can be fully magnetized and may have thicknesses in the range of from 3/16" to ¼", for example.

FIGS. 3 and 4 illustrate a second surface gauge embodiment 24 comprising a metallic gauge plate 25 slidably mounted in a slot 26 of a generally V-shaped holder 27. Plate 25, which may be magnetized or non-magnetized, has a finely machined straight template edge 28 formed thereon. An indicia means 29, shown in the form of an arrow 30, indicates to the worker which edge of plate 25 constitutes the template edge.

As more clearly shown in FIG. 4, holder 27 comprises a pair of legs 31 and 32 which diverge away from each other, from slot 26. The angular disposition of the legs is preferably bisected by slot 26. Legs 31 and 32 thus define a generally V-shaped recess 33 (shown as an acute angle approximating 45°) in holder 27 for accommodating journal 12 and other journals 12' and 12", having different diameters.

Upon mounting of holder 27 on a particular journal, plate 25 will slide within slot 26 to engage template edge 28 thereof with outer surface 11 of the journal. The straddling relationship of legs 31 and 32 of the holder will ensure that template edge 28 is maintained at least substantially parallel, relative to longitudinal axis X of a particular journal. It should be noted in FIG. 3 that holder 27 is preferably disposed perpendicular to longitudinal axis X of journal 12 during the surface inspection procedure, but may be tipped slightly relative to such axis, as shown by the holder's tipped position 27', without affecting the desired results.

Inspection of any surface irregularities on surface 11 of journal 12 is made in the same manner as described above. It should be further noted that when a plurality of gauge plates 25 are provided in kit-form, that only a single holder 27 is required for use therewith.

INDUSTRIAL APPLICABILITY

Referring once again to FIGS. 1 and 2, gauge 10 is particularly useful for determining surface irregularities on a cylindrical surface 11 of a main bearing journal 12 which forms part of a crankshaft of an engine. Gauge 10 is primarily utilized to detect the more pronounced irregularities worn into journal surface 11 upon extended operation of the engine, such as grooves having a depth of 200 micro-inches or greater. Surface texture comparison replicas may be utilized by the worker to detect, by sight and feel, the finer surface irregularities, less than 200 micro-inches.

The worker will initially engage template edge 15 of gauge 10 with journal surface 11 to dispose the edge at least substantially parallel relative to longitudinal X of journal 12. Gauge 10 may be engaged with journal 12 while the crankshaft remains in place in the engine, with the bearing cap for journal 12 having been removed, or the crankshaft may be completely removed from the engine for repair purposes.

Once gauge 10 has been properly mounted on journal 12 as shown in FIGS. 1 and 2, the gauge will be held in place by the relatively strong magnetic force thereof, depicted by flux lines 16. As shown in FIG. 2, a first side 20 of gauge 10 is then subjected to a light source 19 whereby the worker positioned on a second side 21 of the gauge may visually detect the emission of light between journal surface 11 and template edge 15 of gauge 10. As indicated above, handle 10a will aid the worker in correctly positioning template edge 15 on journal surface 11 and will further function to block passage of excessive light thereby. Any irregular surface areas on journal surface 11 may then be suitably marked by the worker for subsequent machining purposes to substantially conform the journal surface to template edge 15 of gauge 10. The worker may then employ a second gauge 10' in a like manner to determine any surface irregularities in journal surface 22 of rod journal 23. Other gauges in the kit supplied to the worker may be utilized for gauging other journal surfaces in the engine.

The FIGS. 3 and 4 surface gauge 24 would be utilized by a worker in a like manner. In particular, the worker would initially insert the proper gauge plate 25 within slot 26 of holder 27 and engage template edge 28 thereof with bearing surface 11 of journal 12. A light source disposed on one side of gauge 24 will thus permit the worker to visually detect any irregularities on bearing surface 11 for subsequent machining.

Other aspects, objects and advantages of this invention can be obtained from a study of the drawings, the disclosure and the appended claims.

I claim:

1. A crankshaft journal surface gauge (10,24) for detecting the surface irregularities of an arcuate surface (11) of a crankshaft journal (12) comprising a metallic and magnetized (16) plate (10,25) having a straight and uninterrupted template edge means (15,28) for engaging the arcuate surface (11) of said crankshaft journal (12), in at least substantial parallel relationship relative to a longitudinal axis (X) of said crankshaft journal (12), and for detecting any irregularities in the surface (11) of said crankshaft journal (12).

2. The surface gauge of claim 1 further including indicia means (17,29) on said plate (10,25) for indicating said template edge means (15,28).

3. The surface gauge of claim 1 further comprising handle means (10a) for indicating said template edge means (15) and for blocking passage of excess light thereby, said handle means (10a) secured to an edge of said gauge (10) opposite the template edge means (15) thereof.

4. The surface gauge of claim 1 further including a holder (27) defining a slot (26) therein and wherein said plate (25) is reciprocally mounted in said slot (26).

5. The surface gauge of claim 4 wherein said plate (25) is disposed at least substantially perpendicular relative to said holder (27).

6. The surface gauge of claim 5 wherein said holder (27) includes a pair of legs (31,32) extending away from said slot (26) in diverging relationship relative to each other to generally define a V-shaped recess (33), said slot (26) disposed in at least approximate bisecting relationship relative to the relative angular disposition of said legs (31,32).

7. The surface gauge of claim 1 wherein a surface gauge kit includes a plurality of said surface gauges (10,10',24) each having a template edge means (15,15',28) for engaging a journal surface (11,22) of a respective member (12,23) in at least substantial parallel relationship relative to a longitudinal axis "X" of said respective member (12,23), and for detecting any irregularities in said journal surface (11,22), the respective template edge means (15,15',28) of said gauges (10,10',24) having different lengths ($L_1,L_2$) for detecting irregularities on surfaces (11,22) having different lengths in the direction of said longitudinal axis (X).

8. A crankshaft journal surface gauge (24) for detecting the surface irregularities of an arcuate surface (11) of a crankshaft journal (12) comprising a plate (25) having straight and uninterrupted template edge means (28) for engaging the arcuate surface (11) of said crankshaft journal (12), in at least substantial parallel relationship relative to a longitudinal axis (X) of said crankshaft journal (12), and for detecting any irregularities in the surface (11) of said crankshaft journal (12), and a holder (27) defining a slot (26) therein and wherein said plate (25) is reciprocally mounted in said slot (26).

* * * * *